(12) United States Patent
Iida et al.

(10) Patent No.: US 11,262,500 B2
(45) Date of Patent: Mar. 1, 2022

(54) SEMICONDUCTOR DEVICE AND INCLUDING AN OPTICAL WAVEGUIDE AND METHOD OF MANUFACTURING THE SAME

(71) Applicant: RENESAS ELECTRONICS CORPORATION, Tokyo (JP)

(72) Inventors: Tetsuya Iida, Tokyo (JP); Yasutaka Nakashiba, Tokyo (JP); Seigo Namioka, Tokyo (JP); Tomoo Nakayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/700,580

(22) Filed: Dec. 2, 2019

(65) Prior Publication Data
US 2021/0165160 A1 Jun. 3, 2021

(51) Int. Cl.
| | | |
|---|---|---|
| G02B 6/122 | (2006.01) | |
| G02B 6/13 | (2006.01) | |
| G02F 1/025 | (2006.01) | |
| G02B 6/12 | (2006.01) | |

(52) U.S. Cl.
CPC ............. *G02B 6/122* (2013.01); *G02B 6/13* (2013.01); *G02F 1/025* (2013.01); *G02B 2006/12142* (2013.01)

(58) Field of Classification Search
CPC . G02B 6/13; G02B 6/122; G02B 2006/12142
USPC .......................................................... 385/14
See application file for complete search history.

(56) References Cited

U.S. PATENT DOCUMENTS

| | | | | |
|---|---|---|---|---|
| 6,385,223 B1* | 5/2002 | Kurihara | ............. | G02B 6/4224 372/43.01 |
| 8,213,751 B1* | 7/2012 | Ho | .......................... | G02B 6/43 385/14 |
| 8,652,934 B1* | 2/2014 | Meade | ................. | G02B 6/1225 438/427 |
| 9,977,186 B2* | 5/2018 | Nakashiba | ............. | G02B 6/136 |
| 10,120,128 B2* | 11/2018 | Iida | ......... | G02B 6/136 |
| 10,502,896 B2* | 12/2019 | Meade | ................... | G02B 6/122 |
| 10,901,151 B2* | 1/2021 | Cho | ..................... | G02B 6/1228 |
| 2006/0018590 A1* | 1/2006 | Murayama | ............. | G02B 6/422 385/15 |
| 2007/0280587 A1* | 12/2007 | Makita | ..................... | G02B 6/42 385/14 |
| 2009/0274418 A1* | 11/2009 | Holzwarth | ............. | G02B 6/122 385/30 |
| 2013/0015546 A1* | 1/2013 | Joe | ......................... | G02B 6/124 257/432 |
| 2014/0241682 A1* | 8/2014 | Sandhu | .................. | G02B 6/136 385/123 |

(Continued)

FOREIGN PATENT DOCUMENTS

JP 2019-139075 A 8/2019

*Primary Examiner* — Michelle R Connelly
(74) *Attorney, Agent, or Firm* — McDermott Will & Emery LLP

(57) ABSTRACT

A semiconductor device includes a semiconductor substrate having a first surface, a second surface opposite to the first surface, and having a first recess portion formed on the first surface, a first cladding layer located in the first recess portion, and a first optical waveguide formed on the first cladding layer. The first optical waveguide overlaps with the first cladding layer in plan view.

7 Claims, 19 Drawing Sheets

(56) References Cited

U.S. PATENT DOCUMENTS

| | | | |
|---|---|---|---|
| 2015/0316719 A1* | 11/2015 | Nakagawa | G02F 1/025 216/24 |
| 2015/0340273 A1* | 11/2015 | Jaffe | G02B 6/1347 257/506 |
| 2016/0056115 A1* | 2/2016 | Kunishima | G02F 1/025 385/14 |
| 2016/0202421 A1* | 7/2016 | Chen | G02B 6/1228 385/49 |
| 2016/0282554 A1* | 9/2016 | Watanuki | G02B 6/136 |
| 2017/0052318 A1* | 2/2017 | Hofrichter | G02B 6/136 |
| 2018/0372950 A1* | 12/2018 | Usami | G02B 6/12 |

* cited by examiner

SEMICONDUCTOR DEVICE AND INCLUDING AN OPTICAL WAVEGUIDE AND METHOD OF MANUFACTURING THE SAME

BACKGROUND

The present disclosure relates to semiconductor device and method of manufacturing the semiconductor device, for example, the present disclosure relates to a semiconductor device including an optical waveguide and method of manufacturing the semiconductor device.

There is a disclosed technique listed below.
[Patent Document 1] Japanese Unexamined Patent Application Publication No. 2019-139075

As an optical communication technique, a silicon photonics technique is known. The semiconductor device employing the silicon photonics technique includes, for example, a semiconductor substrate, an insulating layer formed on the semiconductor substrate, and an optical waveguide formed on the insulating layer (for example, Patent Document 1).

The insulating layer is a cladding layer for substantially confining light propagating inside the optical waveguide to the inside of the optical waveguide. The light travels in the optical waveguide while seeping out of the optical waveguide by the wavelength order of the light. Therefore, it is preferable that a thickness of the insulating layer is greater than a light seepage from the optical waveguide. Thereby, when the light travels in the optical waveguide, scattering of the seeped light by the semiconductor substrate is suppressed.

However, in the conventional semiconductor device, the insulating layer is formed on the entire surface of the semiconductor substrate. Therefore, in the manufacturing process of the semiconductor device, when the semiconductor substrate is to be held by, for example, electrostatic chucking, a large amount of charges is accumulated in the insulating layer. Therefore, the semiconductor substrate and the electrostatic chuck are fixed by the electrostatic force. Attempts to remove the semiconductor substrate from the electrostatic chuck can cause the semiconductor substrate to crack. Further, even when the semiconductor substrate is not cracked, the characteristics of the semiconductor device may be deteriorated due to the stress on the semiconductor substrate. As described above, in the conventional semiconductor device, there is room for improvement from the viewpoint of enhancing the characteristics of the semiconductor device.

A problem of the present embodiments is improving of the characteristics of a semiconductor device. Other problems and novel features will become apparent from the description of the specification and drawings.

SUMMARY

A semiconductor device according to the embodiments includes a semiconductor substrate having a first surface, a second surface opposite to the first surface, and having a first recess portion formed on the first surface, a first cladding layer located in the first recess portion, and a first optical waveguide formed on the first cladding layer.

A method of manufacturing the semiconductor device according to the embodiments includes: (a) providing a first semiconductor wafer having a first surface and a second surface opposite to the first surface; (b) forming a first recess portion on the first surface of the first semiconductor wafer; (c) forming a first cladding layer in the first recess portion; (d) laminating the first surface of the first semiconductor wafer and the first cladding layer with a second semiconductor wafer after forming the first cladding layer; and (e) processing the second semiconductor wafer to form an optical waveguide.

A method for manufacturing a semiconductor device according to another embodiments includes: (a) providing a first semiconductor wafer having a first surface and a second surface opposite to the first surface; (b) forming a second recess portion on the first surface of the first semiconductor wafer; (c) forming a first insulating layer on the first surface of the first semiconductor wafer; (d) providing a third semiconductor wafer having a second insulating layer and a semiconductor layer formed on the second insulating layer; (e) laminating the first insulating layer of the first semiconductor wafer and the second insulating layer of the third semiconductor wafer to each other after the (c); and (e) processing the semiconductor layer of the third semiconductor wafer to form an optical waveguide.

According to embodiments, the characteristics of the semiconductor device can be improved.

DETAILED DESCRIPTION

Figure 1:
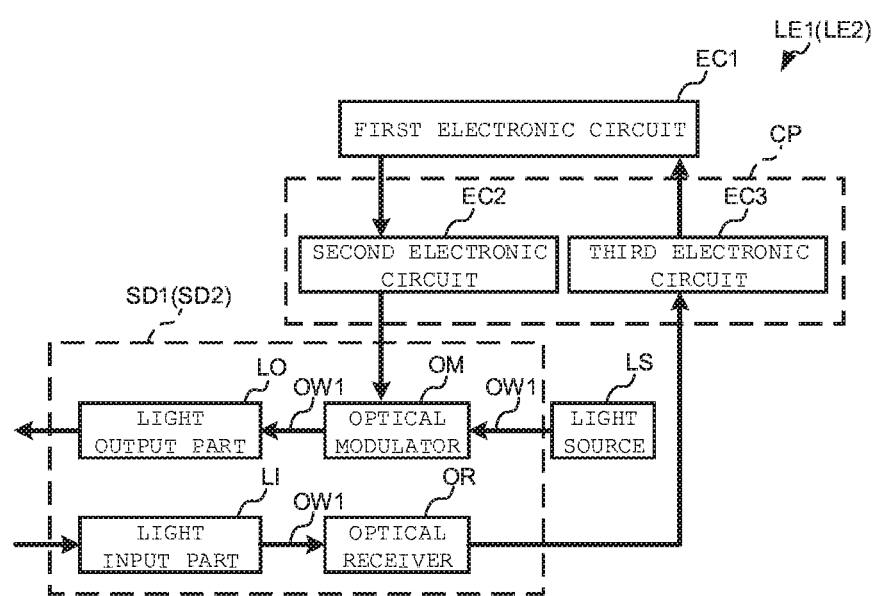
FIG. 1 is a block diagram showing an exemplary configuration of a optoelectronic hybrid device according to first and second embodiments.

Hereinafter, a semiconductor device according to embodiments will be described in detail by referring to the drawings. In the specification and drawings, the same or corresponding constituent elements are denoted by the same reference numerals or hatching, and overlapping descriptions are omitted. In the drawings, for convenience of description, a configuration may be omitted or simplified. A cross-sectional view may be shown as an end view. At least a portion of each embodiment and each modification may be arbitrarily combined with each other.

First Embodiment (Configuration of Optoelectronic Hybrid Device)

FIG. 1 is a block diagram showing an exemplary configuration of an optoelectronic hybrid device LE1 according to a first embodiment.

As shown in FIG. 1, the optoelectronic hybrid device LE1 includes a first electronic circuit EC1, a semiconductor device SD1, a light source LS, and an IC chip CP. The semiconductor device SD1 according to the first embodiment includes an optical waveguide OW1, an optical modulator OM, a light output part LO, a light input part LI and an optical receiver OR. The IC chip CP includes a second electronic circuit EC2 and a third electronic circuit EC3. The configuration of the semiconductor device SD1 will be described in detail later.

The first electronic circuit EC1 outputs an electrical signal for controlling the second electronic circuit EC2. The First electronic circuit EC1 receives an electrical signal outputted from the third electronic circuit EC3. The first electronic circuit EC1 is electrically coupled to the second electronic circuit EC2 and the third electronic circuit EC3. The first electronic circuit EC1 is formed of, for example, a known Central Processing Unit (CPU) or Field-Programmable gate array (FPGA) which include a control circuit and a storage circuit.

The light source LS emits light. Examples of types of light sources LS include laser diode. A wavelength of the light emitted from the light source LS may be appropriately set in accordance with the materials constituting the optical waveguide OW1, as long as the light emitted from the light source LS can pass through the inside of the optical waveguide OW1. For example, a peak wavelength of the light emitted from the light source LS is 1.0 µm or more and 1.6 µm or less. The light source LS is optically connected to the optical modulator OM via the optical waveguide OW1.

The second electronic circuit EC2 outputs an electric signal (control signal) for controlling the operation of the optical modulator OM. More specifically, the second electronic circuit EC2 controls the optical modulator OM based on the control signal received from the first electronic circuit EC1. The second electronic circuit EC2 is electrically coupled to the optical modulator OM. The second electronic circuit EC2 is constituted by, for example, a well-known transceiver IC including a control circuit.

The optical modulator OM modulates a phase of the light emitted from the light source LS based on the electrical signal received from the second electronic circuit EC2. The optical modulator OM generates an optical signal including information included in the electrical signal. Examples of types of the optical modulator OM include Mach-Zehnder type optical modulator and ring-type optical modulator. The optical modulator OM may be an electrically controlled optical modulator, or a combined optical modulator using a combination of electrical control and thermal control. The optical modulator OM is optically connected to the light output part LO via the optical waveguide OW1.

The light output part LO outputs the optical signal modulated by the optical modulator OM to the outside of the semiconductor device SD1. For example, the light output part LO emits an optical signal toward an external optical fiber. Examples of types of light output part LO include a grating coupler and a spot size converter.

The light input part LI inputs external light into the semiconductor device SD1. For example, an optical signal emitted from the external optical fiber is inputted into the semiconductor device SD1. Examples of types of light input part LI include a grating coupler and a spot size converter. The light input part LI is optically connected with the optical receiver OR via the optical waveguide OW1.

The optical receiver OR generates electron-hole pairs based on the optical signal received from the light input part LI. The optical receiver OR converts an optical signal into an electric signal. The optical receiver OR may have photoelectric conversion characteristics. Examples of the type of the optical receiver OR include an avalanche photodiode type optical receiver. The optical receiver OR is electrically coupled to the third electronic circuit EC3.

The third electronic circuit EC3 processes the electrical signal received from the optical receiver OR and outputs the processed electrical signal to the first electronic circuit EC1. More specifically, the third electronic circuit EC3 amplifies the electric signal received from the optical receiver OR and outputs the amplified electrical signal to the first electronic circuit EC1. The third electronic circuit EC3 is constituted by, for example, a known receiver IC including an amplifier circuit.

(Operation of Optoelectronic Hybrid Device)

Next, an operation example of the optoelectronic hybrid device LE1 according to the present embodiment will be described.

First, a transmission part of the optoelectronic hybrid device LE1 will be described. The light emitted from the light source LS reaches the optical modulator OM via the optical waveguide OW1. The second electronic circuit EC2 outputs an electric signal for controlling the operation of the optical modulator OM to the optical modulator OM based on the control signal received from the first electronic circuit EC1. The optical modulator OM modulates light passing through the optical modulator OM. As a result, the electric signal is converted into an optical signal. The optical signal reaches the light output part LO via the optical waveguide OW1, and the optical signal is output to the outside of the semiconductor device SD1 at the light output part LO. The optical signal emitted from the semiconductor device SD 1 is guided to another optoelectronic hybrid device via an optical fiber or the like.

Next, a receiving part of the optoelectronic hybrid device LE1 will be described. An optical signal received from another optoelectronic hybrid device, such as via an optical fiber, arrives at the light input part LI. The optical signal is guided to the inside of the optical waveguide OW1 in the light input part LI. The optical signal reaches the optical receiver OR via the optical waveguide OW1, and is converted into an electric signal. The electric signal is processed by the third electronic circuit EC3 and then transmitted to the first electronic circuit EC1.

(Configuration of Semiconductor Device)

Figure 2:
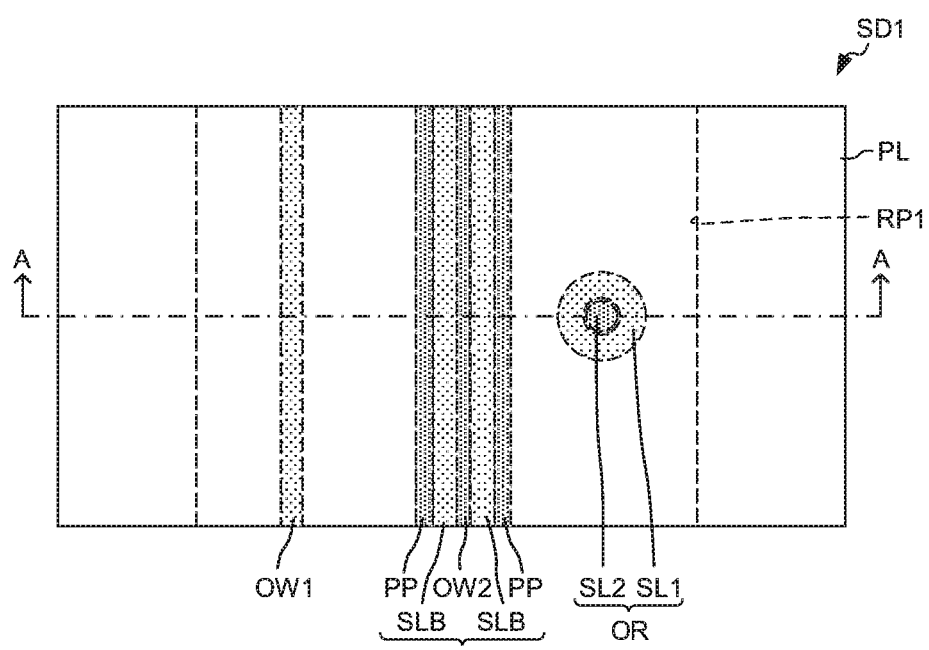
FIG. 2 is a plan view showing an exemplary configuration of a main portion of the semiconductor device according to the first embodiment.
Figure 3:
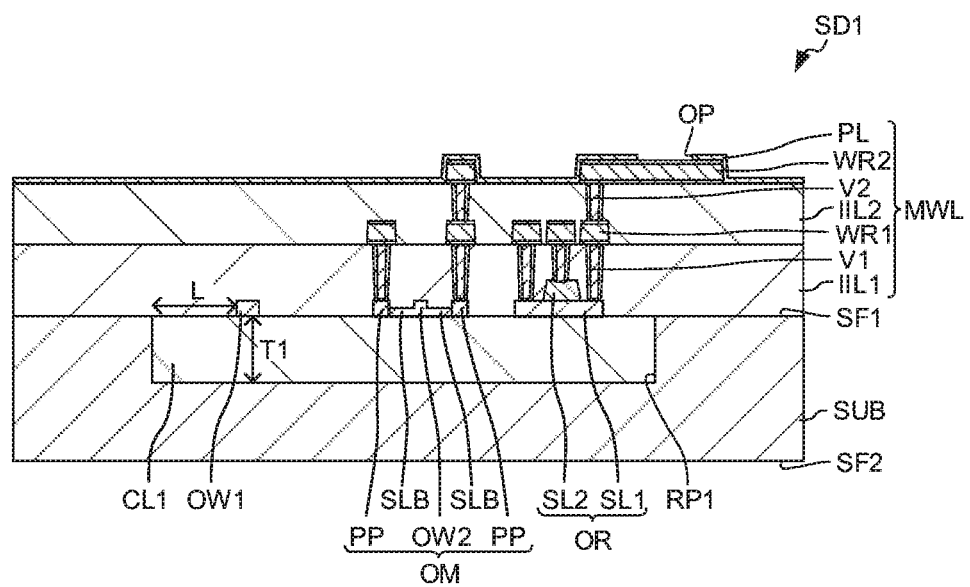
FIG. 3 is a cross-sectional view showing an exemplary configuration of the main portion of the semiconductor device according to the first embodiment.

Next, the configuration of the semiconductor device SD1 according to the first embodiment will be described. FIG. 2 is a plan view showing an exemplary configuration of a main portion of the semiconductor device SD1. FIG. 3 is a cross-sectional view showing an exemplary configuration of the main portion of the semiconductor device SD1. FIG. 3 is a cross-sectional view taken along line A-A of FIG. 2. In FIG. 2, a part of the constituent elements is omitted from the viewpoint of making the positional relation between the optical waveguide OW1, the optical modulator OM and the optical receiver OR and the first recess portion RP1 easy to see.

The semiconductor device SD1 includes a semiconductor substrate SUB, a cladding layer CL1, the optical waveguide OW1, the optical modulator OM, the optical receiver OR, and a multilayer wiring layer MWLs. As will be described in detail later, the multilayer wiring layer MWL includes a first interlayer insulating layer IIL1, a first via V1, a first wiring WR1, a second interlayer insulating layer IIL2, a second via V2, a second wiring WR2, and a protective layer PL.

The semiconductor substrate SUB supports optical elements such as the optical waveguide OW1, the optical modulator OM and the optical receiver OR via cladding layer CL1. The semiconductor substrate SUB includes a first surface (front surface) SF1 and a second surface (back surface) SF2 that are in front and back relation with each other. The first surface SF1 is located on the other side of the semiconductor substrate SUB from the second surface SF2.

Examples of types of the semiconductor substrate SUB include silicone substrate. The silicon substrate is, for example, a silicon single-crystal substrate containing impurities such as boron (B) and phosphorus (P). For example, a plane orientation of a main surface of the silicon substrate is (100), and a resistivity of the silicon substrate is 5 Ω·2-cm or more and 50 Ω·cm or less. A thickness of the semiconductor substrate SUB is, for example, 100 μm or more and 900 μm or less.

A first recess portion RP1 is formed on the first surface SF1 of the semiconductor substrate SUB. The position, size, shape, and number of the first recess portion RP1 define the position, size, shape, and number of the cladding layer CL1 located in/within the first recess portion RP1. When the cladding layer CL1 is formed of an insulating film, charges are accumulated in the cladding layer CL1 in the manufacturing process. From the viewpoint of reducing the quantity of accumulated charges, it is preferable that a ratio occupied by the first recess portion RP1 in the first surface SF1 is small. In addition, in the process of manufacturing the semiconductor device SD1, from the viewpoint of increasing the bonding strength of the first surface SF1, it is preferable that the ratio of the first recess portion RP1 to the semiconductor device SD1 is small (see FIG. 7 (to be described later)). In the first surface SF1, the ratio occupied by the first recess portion RP1 is preferably 50% or less.

The cladding layer CL1 is formed in the first recess portion RP1. The cladding layer CL1 buries the first recess portion RP1. The cladding layer CL1 is a cladding layer for substantially confining the light propagating inside the optical waveguide OW1 and optical modulator OM to the inside of the optical waveguide OW1 and the optical modulator OM, respectively. The bottom surface of the cladding layer CL1 is also a reflection surface for reflecting the light which entered the optical receiver OR from the multilayer wiring layer MWL side and has passed through the optical receiver OR toward the optical receiver OR again.

A material of the cladding layer CL1 has a refractive index that is less than the refractive index of a material of the optical waveguide OW1. In the first embodiment, the cladding layer CL1 is an insulating film. Examples of the insulating film include silicon oxide ($SiO_2$). The refractive index of the material of the cladding layer CL1 is, for example, 1.46. In this specification, the refractive index is a numerical value for light having a wavelength of 1.5 μm.

The position of the cladding layer CL1 is appropriately determined in accordance with the position of optical elements such as the optical waveguide OW1, the optical modulator OM and the optical receiver OR. The cladding layer CL1 may overlap with one optical element or may overlap with a plurality of optical elements in plan view. In the first embodiment, the cladding layer CL1 is formed such that the cladding layer CL1 overlaps with optical elements such as the optical waveguide OW1, the optical modulator OM and the optical receiver OR in plan view.

A thickness T1 of the cladding layer CL1 is preferably greater than the light seepage from the optical waveguide OW1 and the optical modulator OM. Light propagating inside the optical waveguide OW1 and the optical modulator OM propagates out of the optical waveguide OW1 and the optical modulator OM by a distance corresponding to wavelength of the light. When the seeped light reaches the semiconductor substrate SUB, the light is scattered. That is, from the viewpoint of suppressing the scattering of the light and reducing the propagating loss of the light, the thickness T1 of the cladding layer CL1 is preferably greater than the seepage distance of the light. On the other hand, it is preferable that the thickness T1 of the cladding layer CL1 is small from the viewpoint of appropriately reflecting the light entering the optical receiver OR from the multilayer wiring layer MWL side and transmitted through the optical receiver OR toward the optical receiver OR. In view of the above, the thickness T1 of the cladding layer CL1 is preferably 2 μm or more and 4 μm or less. The thickness T1 of the cladding layer CL1 is the distance between the lower surface of the optical waveguide OW1, OW2 and the bottom surface of the first recess portion RP1 in a thickness direction of the semiconductor substrate SUB.

In a direction along the first surface SF1 of the semiconductor substrate SUB, it is preferable that a distance L between the opening end of the cladding layer CL1 and the optical element is greater than the light seepage distance. For example, the distance L is preferably 2 μm or more.

The shape of the cladding layer CL1 is not particularly limited. The shape of the cladding layer CL1 in plan view is, for example, a rectangular shape. From the viewpoint of easiness of designing, it is preferable that the cladding layer CL1 has a side along an extending direction of the optical waveguide OW1 in plan view. In other words, it is preferable that the cladding layer CL1 has a side facing the side surface of the optical waveguide OW1 in plan view, as shown in FIG. 2.

The number of cladding layers CL1 may be one or plural. In the first embodiment, the number of cladding layers CL1 is one. The cladding layer CL1 may overlap with one optical element or may overlap with a plurality of optical elements in plan view. In the first embodiment, the cladding layer CL1 overlaps the optical waveguide OW1, the optical modulator OM and the optical receiver OR in plan view.

The optical waveguide is a path configured to allow the light to propagate inside the optical waveguide. The optical waveguide OW1 has an upper surface and a lower surface located opposite to each other, and a first side surface and a second side surface located opposite to each other. The optical waveguide OW1 is formed on the cladding layer CL1. The optical waveguide OW1 is directly or indirectly covered by the cladding layer CL1 and the first interlayer insulating layer IIL1. In the first embodiment, in the optical waveguide OW1, the upper surface, the first side surface, and the second side surface directly contact with the first interlayer insulating layer IIL1. The lower surface of the optical waveguide OW1 is directly contacts with the cladding layer CL1.

The optical waveguide OW1 is covered by a cladding layer CL1 and a first interlayer insulating layer IIL1 having a refractive index less than the refractive index of the material of the optical waveguide OW1. This allows the light to travel within the optical waveguide OW1 while being substantially confined within the optical waveguide OW1. However, as described above, the light travels inside the optical waveguide OW1 while seeping out to the outside of the optical waveguide OW1 by the wavelength order of the light.

The cross-sectional shape of the optical waveguide OW1 in the cross-section perpendicular to the extending direction of the optical waveguide OW1 may be any shape as long as the light can propagate inside the optical waveguide OW1. Examples of the cross-sectional shape of the optical waveguide OW1 include a rectangular shape and a trapezoidal shape. In the first embodiment, the cross-sectional shape of the optical waveguide OW1 is a rectangular shape.

The width and the height (thickness) of the optical waveguide OW1 may be any size as long as the width and the height (thickness) can appropriately propagate the light inside the optical waveguide OW1. A width and a height of the optical waveguide OW1 can be appropriately set in accordance with condition such as wavelength of the light passing through the inside of the optical waveguide OW1, modes of the light, and the like. The width of the optical waveguide OW1 is, for example, 300 nm or more and 500 nm or less. The height of the optical waveguide OW1 is, for example, 200 nm or more and 300 nm or less.

The width of the optical waveguide OW1 is a distance between the first side surface and the second side surface, and is a length of the optical waveguide OW1 in a facing direction in which the first side surface and the second side surface face with each other (a width direction of the optical waveguide OW1). The height of the optical waveguide OW1 is a distance between the lower surface of the optical waveguide OW1 and the upper surface of the optical waveguide OW1 in a facing direction in which the upper surface and the lower surface of the optical waveguide OW1 face with each other.

The material of the optical waveguide OW1 is a semiconducting material which is transparent to light passing through the inside of the optical waveguide OW1. Examples of the material for the optical waveguide OW1 include silicon and germanium. The crystal structure of the material of optical waveguide OW1 may be single crystal or polycrystalline. The refractive index of the material of the optical waveguide OW1 is, for example, 3.5.

As the optical modulator OM, structure known in the silicon photonics technique as optical modulator may be employed. Examples of types of the optical modulator OM include PN-type optical modulator, PIN-type optical modulator, and MOS-type optical modulator. In the first embodiment, the optical modulator OM is a Mach-Zehnder type optical modulator. That is, the optical waveguide OW constituting the optical modulator OM includes an optical waveguide for input, a pair of optical waveguides branched from the optical waveguide for input, and an optical waveguide for output. The pair of optical waveguides is located between the optical waveguide for input and the optical waveguide for output.

The optical modulator OM includes an optical waveguide OW2 and a pair of slab portions SLB. The optical modulator OM is formed on the cladding layer CL1. The optical modulator OM is configured to modulate a phase of the light propagating through the inside of the optical waveguide OW2.

The optical waveguide OW2 is a path configured to allow the light propagating inside the optical modulator OM. Examples of the shape and size of the optical waveguide OW2 is similar to examples of the shape and size of the optical waveguide OW1. Examples of material for the optical waveguide OW2 are p-type semiconductor material, n-type semiconductor material and intrinsic semiconductor material. When the optical modulator OM is a PN-type optical modulator, the optical waveguide OW2 includes a p-type semiconductor portion formed of a p-type semiconductor material and an n-type semiconductor portion formed of an n-type semiconductor material. The p-type semiconductor portion is formed on the first side surface side in the optical waveguide OW2, and the n-type semiconductor portion is formed on the second side surface side in the optical waveguide OW2. When the optical modulator OM is a PIN-type optical modulator, the optical waveguide OW2 further includes a low-concentration semiconductor portion formed between the p-type semiconductor portion and the n-type semiconductor portion. When the optical modulator OM is a MOS-type optical modulator, the optical waveguide OW2 is composed of the p-type semiconductor portion or the n-type semiconductor portion.

An impurity concentration of the p-type semiconductor portion is, for example, $1\times10^{16}$ cm-3 or more. An impurity concentration of the n-type semiconductor portion is, for example, $1\times10^{16}$ cm-3 or more. An impurity concentration of the low-concentration semiconductor portion is, for example, less than $1\times10^{16}$ cm-3.

From the viewpoint of suppressing light propagating through the optical waveguide OW2 from being scattered by impurities included in the optical waveguide OW2, the impurity concentration of the optical waveguide OW2 is preferably $1\times10^{17}$ cm-3 or less, for example, and more preferably about $1\times10^{16}$ cm-3.

A difference between a crystal orientation of the optical waveguide OW2 and a crystal orientation of the semiconductor substrate SUB is preferably 0° or more and 50° or less, more preferably 40° or more and 50° or less, and still more preferably about 45°. For example, when the difference is 45°, the plane orientation (000) of the optical waveguide OW2 and the plane orientation (000) of the semiconductor substrate SUB differs by 45° with each other in plan view. Based on a crystallographic orientation, a stress applied to the optical waveguide OW2 and the slab portion SLB can be adjusted to increase carrier mobility in optical modulator OM.

The pair of slab portions SLB is formed on the cladding layer CL1 such that the pair of slab portions SLB is adjacent to the first side surface and the second side surface of the optical waveguide OW2, respectively, in the width direction of the optical waveguide OW2. The slab portion SLB is formed integrally with the optical waveguide OW2 as a single member. A height (thickness) of the slab portion SLB is preferably smaller than the height of the optical waveguide OW2 from the viewpoint of appropriately confining light inside the optical waveguide OW2. The height of the slab portion SLB is preferably about 100 nm.

The slab portion SLB is composed of a p-type semiconductor material or an n-type semiconductor material. The conductivity type of the material of the slab portion SLB is appropriately determined according to the type of the optical modulator OM. An impurity concentration of the slab portion SLB is preferably, for example, $1 \times 10^{18}$ cm-3 or more and $1 \times 10^{20}$ cm-3 or less.

The slab portion SLB preferably has protruding portion PP. A height of the first via V1 formed on the slab portion SLB can be adjusted in accordance with a height of the protruding portion PP. In addition, from the viewpoint of compatibility between the reduction of the contact resistance between the slab portion SLB and the first via V1 and the suppression of light scattering caused by the impurities in the slab portion SLB, it is preferable that the impurity concentration of the contact portion (protruding portion PP) in contact with the first via V1 in the slab portion SLB is greater than the impurity concentration of a portion other than the protruding portion PP in the slab portion SLB. For example, the impurity concentration of the protruding portion PP is preferably $1 \times 10^{19}$ cm-3 or more, and more preferably about $1 \times 10^{20}$ cm-3. The impurity concentration of the portion other than the protruding portion PP in the slab portion SLB is preferably less than $1 \times 10^{19}$ cm-3, more preferably about $1 \times 10^{18}$ cm-3. The upper surface of the protruding portion PP may be silicided.

As the optical receiver OR, a structure known as optical receiver can be adopted in the silicon photonics technique. In the first embodiment, the optical receiver OR includes a first semiconductor layer SL1 and a second semiconductor layer SL2. The first semiconductor layer SL1 is a semiconductor layer including impurity region having a first conductivity type. The impurity region is formed on the upper surface of the first semiconductor layer SL1. The first conductivity type is p-type or n-type. In first embodiment, the first conductivity type is p-type. A thickness of the first semiconductor layer SL1 is, for example, 180 nm or more and 250 nm or less. A material of the first semiconductor layer SL1 may be a material which absorbs light constituting the optical signal, or may be a material which transmits the light. Examples of material for the first semiconductor SL1 include silicon and germanium. The first semiconductor layer SL1 includes, for example, p-type impurity such as boron (B) and boron difluoride (BF2). The impurity concentration of the first semiconductor layer SL1 is, for example, $1 \times 10^{19}$ cm-3 or more and $1 \times 10^{20}$ cm-3 or less.

The second semiconductor layer SL2 constitutes a part of the optical receiver OR together with the first semiconductor layer SL1. The second semiconductor layer SL2 is a semiconductor layer formed on the first semiconductor layer SL1 and including impurity implanted region of a second conductivity type differing from the first conductivity type. The impurity implanted region is formed on the upper surface of the second semiconductor layer SL2. The second conductivity type is p-type or n-type. In first embodiment, the second conductivity type is n-type. The material of the second semiconductor layer SL2 may be any material as long as the material can absorb the light. The material of the second semiconductor layer SL2 can be appropriately set in accordance with the wavelength of the light constituting the optical signal. Examples of material of the second semiconductor layer SL2 include germanium.

The second semiconductor layer SL2 includes a semiconducting region and the impurity implanted region. The impurity implanted region is formed on the semiconducting region in the second semiconductor layer SL2. The impurity implanted region of the second semiconductor layer SL2 include, for example, n-type impurity such as arsenic (As) and phosphorus (P). From the viewpoint of reducing the leakage current, the impurity implanted region is preferably a region having a thickness of 10 nm or more and 20 nm or less from the upper surface of the second semiconductor layer SL2 in the second semiconductor layer SL2. The impurity concentration of the impurity implanted regions is, for example, $1 \times 10^{19}$ cm-3 or more and $1 \times 10^{20}$ cm-3 or less. The semiconducting region is a region having an impurity concentration that is about two orders of magnitude smaller than the impurity concentration of the impurity implanted region. The impurity concentration of the semiconductor region is, for example, $1 \times 10^{18}$ cm-3 or less.

A thickness of the second semiconductor layer SL2 is preferably large from the viewpoint of increasing the absorption of light in the optical receiver OR. The thickness of the second semiconductor layer SL2 is, for example, 1 μm or more and 3 μm or less, and preferably 1.5 μm or more and 2 μm or less.

The multilayer wiring layer MWL is formed on the semiconductor substrate SUB and the cladding layer CL1 such that the multilayer wiring layer MWL covers the optical waveguide OW1, the optical modulator OM and the optical receiver OR. The multilayer wiring layer MWL is a layer composed of one or more wiring layers. The wiring layer is a layer including an interlayer insulating layer and one or both of a wiring and a via that are formed in the interlayer insulating layer. The via is a conductive member that electrically connects two wiring formed in layers that differ from each other. For example, "wiring" is a metallic layer configured to allow an electrical signal to be transmitted therein.

The multilayer wiring layer MWL includes a first interlayer insulating layer IIL1, a first via V1, a first wiring WR1, a second interlayer insulating layer IIL2, a second via V2, a second wiring WR2, and a protective layer PL.

The first interlayer insulating layer IIL1 is formed on the semiconductor substrate SUB and the cladding layer CL1 such that the first interlayer insulating layer IIL1 covers the optical waveguide OW1, the optical modulator OM and the optical receiver OR. The first interlayer insulating layer IIL1 is formed of a material having a refractive index smaller than that of the material of the optical waveguide OW1, OW2. Examples of material of the first interlayer insulating layer IIL1 include silicon oxide (SiO2). The refractive index of the first interlayer insulating layer IIL1 is, for example, 1.46. The thickness of the first interlayer insulating layer IIL1 is preferably 1.0 μm or more from the viewpoint of suppressing scattering of light seeping out of the optical waveguide OW by the first wiring WR1 formed on the first interlayer insulating layer IIL1. In addition, from the viewpoint of facilitating the manufacturing processes, a thickness of the first interlayer insulating layer IIL1 is preferable 2.0 µm or less.

The first via V1 is formed in the first interlayer insulating layer IIL1 such that the first via V1 reaches the slab portion SLB of the optical modulator OM and the first semiconductor layer SL1 and the second semiconductor layer SL2 of the optical receiver OR, respectively. As the configuration of the first via V1, a known configuration adopted as a via in the semiconductor technology can be adopted. The first via V1 includes, for example, a barrier film and a conductive film formed on the barrier film. Examples of material for the barrier film include titanium (Ti), titanium nitride (TiN), tantalum (Ta), and tantalum nitride (TaN). The material of the conductive film is, for example, tungsten (W), aluminum (Al), or copper (Cu).

The first wiring WR1 is formed on the first interlayer insulating layer IIL1. The first wiring WR1 is electrically connected with the optical modulator OM and the optical receiver OR via the first via V1. As the first wiring WR1, a well-known structure adopted as a wiring in the semiconductor technology can be adopted. The first wiring WR1 is, for example, a stacked film in which a barrier metal, a conductive film, and a barrier metal are stacked in this order. Examples of material constituting the barrier metal include titanium (Ti), titanium nitride (TiN), tantalum (Ta), and tantalum nitride (TaN). Examples of material of the conductive film include aluminum, copper, and tungsten.

The second interlayer insulating layer IIL2 is formed on the first interlayer insulating layer IIL1 such that the second interlayer insulating layer IIL2 covers the first wiring WR1. Examples of material constituting the second interlayer insulating layer IIL2 are similar to those of the first interlayer insulating layer IIL1. A thickness of the second interlayer insulating layer IIL2 is, for example, 1.0 µm or more and 2.5 µm or less.

The second via V2 electrically connects the first wiring WR1 and the second wiring WR2 with each other in the second interlayer insulating layer IIL2. Examples of a configuration of the second via V2 is similar to the configuration of the first via V1.

The second wiring WR2 is formed on the second interlayer insulating layer IIL2. In first embodiment, the second wiring WR2 is an uppermost wiring of the multilayer wiring layer MWL. Examples of the configuration of the second wiring WR2 is similar to those of the first wiring WR1.

The protective layer PL protects the semiconductor device SD1 from external moisture and the like. The protective layer PL is formed on the second interlayer insulating layer IIL2 such that the protective layer PL covers the second wiring WR2. In the protective layer PL, an opening OP exposing a portion of the second wiring WR2 is formed in the protective layer PL. The protective layer PL directly contacts with a side surface of the second wiring WR2 and a portion of the upper surface of the second wiring WR2. The protective layer PL may be a single layer film or a stacked film of two or more layers. Examples of the protective layer PL include a silicon oxide film, a silicon oxynitride film, a silicon nitride film, a PSG (Phospho Silicate Glass) film, and a stacked film of these films. The thickness of the protective layer PL is, for example, 0.3 µm or more and 0.7 µm or less.

(Method of Manufacturing Semiconductor Device)

Next, an exemplary method of manufacturing the semiconductor device SD1 according to the first embodiment will be described. FIGS. 4 to 10 are cross-sectional view diagrams showing exemplary steps included in the method of manufacturing the semiconductor device SD1.

The method of manufacturing the semiconductor device SD1 includes, for example, (1) a step of providing a first semiconductor wafer SW1 and a second semiconductor wafer SW2, (2) a step of forming a first recess portion RP1, (3) a step of forming a cladding layer CL1, (4) a step of laminating a second semiconductor wafer SW2, (5) a step of forming optical elements, and (6) a step of forming semiconductor device MWL.

(1) Providing the First Semiconductor Wafer SW1 and the Second Semiconductor Wafer SW2

Figure 4:
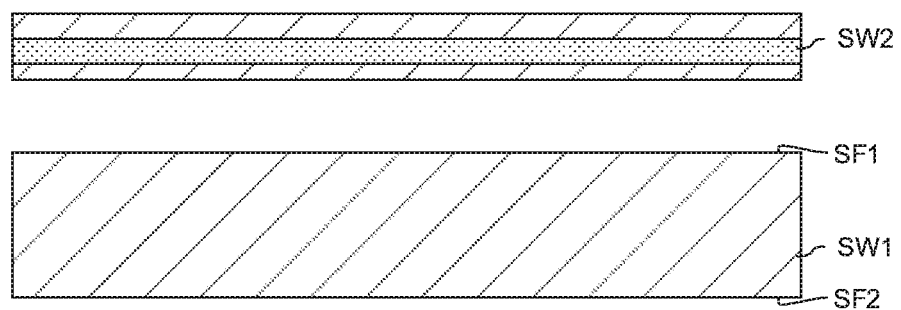
FIG. 4 is a cross-sectional view showing an exemplary step included in a method of manufacturing the semiconductor device according to the first embodiment.

First, as shown in FIG. 4, a first semiconductor wafer SW1 and a second semiconductor wafer SW2 are provided. The first semiconductor wafer SW1 and the second semiconductor wafer SW2 may be purchased as commercial products. The first semiconductor wafer SW1 provided is held by an electrostatic chuck.

The first semiconductor wafer SW1 has a first surface SF1 and a second surface SF2 which opposite to the first surface SF1. The first semiconductor wafer SW1 is formed of, for example, silicon. An impurity of a desired impurity concentration may be implanted into the first semiconductor wafer SW1 by an ion implantation method.

The second semiconductor wafer SW2 includes, for example, impurity layer (texture portion in FIG. 4) in which hydrogen H2 is ion-implanted at the center in the thickness direction of the semiconductor wafer SW2. The second semiconductor wafer SW2 is formed of, for example, silicon.

(2) Forming the First Recess Portion RP1

Figure 5:
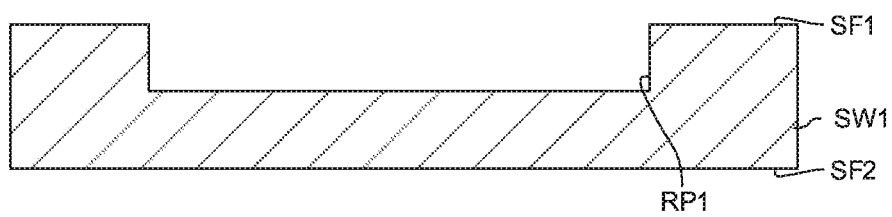
FIG. 5 is a cross-sectional view showing an exemplary step included in the method of manufacturing the semiconductor device according to the first embodiment.

Next, as shown in FIG. 5, the first recess portion RP1 is formed on the first surface SF1 of the first semiconductor wafer SW1. Examples of the method of forming the first recess portion RP1 include a dry etching method and a wet etching method. Examples of an etching solution used in the wet etching method include an aqueous solution of potassium hydroxide (KOH), an aqueous solution of tetramethylammonium hydroxide (TMAH), an aqueous solution of ethylenediamine pyrocatechol (EDP), an aqueous solution of hydrazine (N2H), an aqueous solution of sodium hydroxide, and an aqueous solution of cesium hydroxide (CsOH).

(3) Forming the Cladding Layer CL1

Figure 6:
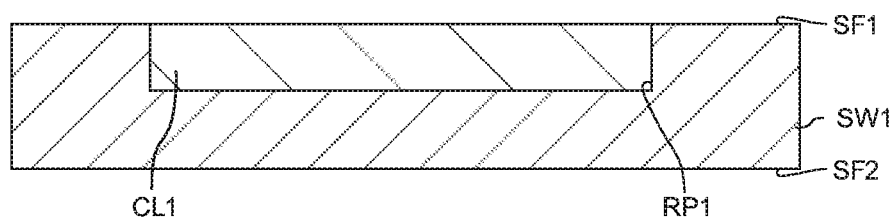
FIG. 6 is a cross-sectional view showing an exemplary step included in the method of manufacturing the semiconductor device according to the first embodiment.

Next, as shown in FIG. 6, the cladding layer CL1 is formed in the first recess portion RP1. For example, in the cladding layer CL1, after a layer formed of a material of the cladding layer CL1 is formed on the first surface SF1 of the first semiconductor wafer SW1 so as to fill the first recess portion RP1, an extra portion of the layer located outside the first recess portion RP1 may be removed. Examples of method of forming the layer include CVD method and thermal oxidation method. The method of removing the layer is, for example, CMP method.

(4) Laminating of the Second Wafer SW2

Figure 7:
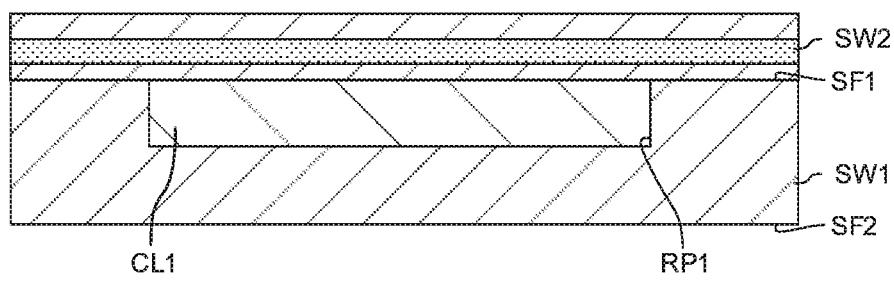
FIG. 7 is a cross-sectional view showing an exemplary step included in the method of manufacturing the semiconductor device according to the first embodiment.
Figure 8:
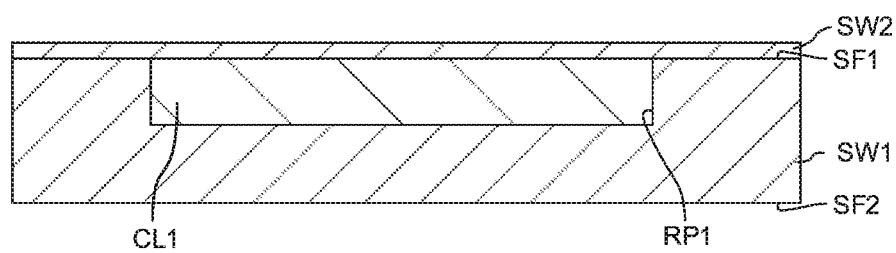
FIG. 8 is a cross-sectional view showing an exemplary step included in the method of manufacturing the semiconductor device according to the first embodiment.

Next, as shown in FIG. 7, the first surface SF1 of the first semiconductor wafer SW1 and the second semiconductor wafer SW2 are laminated to each other. More specifically, as shown in FIG. 7, for example, a second semiconductor wafer SW2 having an impurity layer (textured portion in FIG. 7) in which hydrogen H2 is ion-implanted in the center of the thickness direction of the semiconductor wafer SW2 is laminated to the first surface SF1 of the first semiconductor wafer SW1 and the cladding layer CL1. Next, as shown in FIG. 8, a portion of the second semiconductor wafer SW2 farther from the first semiconductor wafer SW1 than the impurity layer is removed. Finally, an upper surface of the second semiconductor wafer SW2 is polished. The polishing method of the second semiconductor wafer SW2 is, for example, CMP method.

In the laminating step of the second semiconductor wafer SW2, the first semiconductor wafer SW1 and the second semiconductor wafer SW2 may be heated. The heat temperature in the laminating process of the second semiconductor wafer SW2 is preferably 200° C. or more and 600° C. or less. As a result, it is possible to suppress the adhesion between the laminated first semiconductor wafer SW1 and the second semiconductor wafer SW2 from decreasing due to a difference in the coefficient of thermal expansion of the material. The heating time in the laminating step is preferably 1 hour or more and 3 hours or less.

(5) Formation of the Optical Elements

Figure 9:
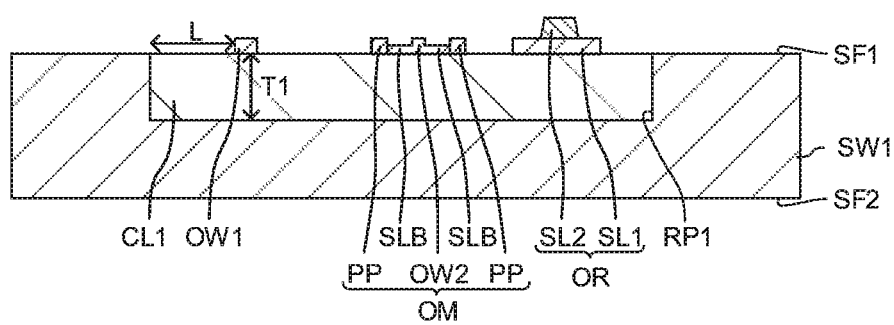
FIG. 9 is a cross-sectional view showing an exemplary step included in the method of manufacturing the semiconductor device according to the first embodiment.

Next, as shown in FIG. 9, the second wafer SW2 is processed to form optical elements on the cladding layer CL1. In the first embodiment, the optical waveguide OW1, the optical modulator OM and the optical receiver OR are formed as the optical elements. The optical waveguide OW1 is formed by patterning the second wafer SW2. The optical modulator OM is formed by patterning the second semiconductor wafer SW2 and then implanting an impurity into a region to be the second optical waveguide OW2 and the slab portion SLB by an ion implantation method. The second semiconductor wafer SW2 is patterned by dry etching, for example.

Examples of method for forming the optical receiver OR is as follows. First, the second semiconductor wafer SW2 is patterned to form a first semiconductor layer SL1, and then an impurity is implanted into the first semiconductor layer SL1 by an ion implantation method. Next, after an epitaxial layer is formed on the first semiconductor layer SL1 by a selective epitaxial growth method, an impurity is implanted into a desired region by ion implantation method. Thus, the second semiconductor layer SL2 is formed on the first semiconductor layer SL1. As a result, the optical receiver OR including the first semiconductor layer SL1 and the second semiconductor layer SL2 is formed.

(6) Forming the Multilayer Wiring Layer MWL

Figure 10:
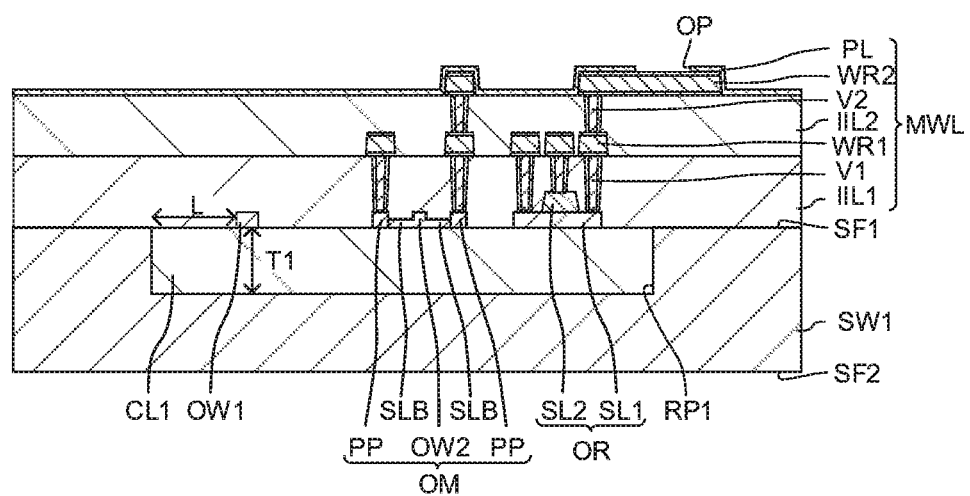
FIG. 10 is a cross-sectional view showing an exemplary step included in the method of manufacturing the semiconductor device according to the first embodiment.

Next, as shown in FIG. 10, the multilayer wiring layer MWL is formed on the first semiconductor wafer SW1. As a method for forming the multilayer wiring layer MWL, a known method can be employed as a method for forming the multilayer wiring layer in the semiconductor technology. In the first embodiment, the first interlayer insulating layer IIL1, the first via V1, the first wiring M1, the second interlayer insulating layer IIL2, the second via V2, the second wiring M2, and the protective layer PL are formed in this order.

The first interlayer insulating layer IIL1 and the second interlayer insulating layer IIL2 are formed by, for example, CVD method. The first via V1 is formed, for example, by forming a through hole in the first interlayer insulating layer IIL1 and then filling the through hole with a conductive material. The second via V2 is formed, for example, by forming a through hole in the second interlayer insulating layer IIL2 and then filling the through hole with a conductive material. The first wiring M1 is formed by forming a first interlayer insulating layer IIL1 by sputtering method, and then patterning the conductive film into a desired configuration. The second wiring M2 is formed by forming a conductive film as the second interlayer insulating layer IIL2 by a sputtering method, and then patterning the conductive film into a desired shape. The protective layer PL is formed on the second interlayer insulating layer IIL2 so as to cover the second wiring M2 by sputtering method. The method of forming the opening OP of the protective layer PL is, for example, dry etching method.

Finally, the structure obtained by the above steps is detached from the electrostatic chuck and diced to obtain a plurality of singulated semiconductor devices SD1.

(Effect)

In the semiconductor device SD1 according to the first embodiment, the cladding layer CL1 is formed in the first recess portion RP1 of the semiconductor substrate SUB. As a result, the quantity of charges accumulated in the cladding layer CL1 in the manufacturing process is smaller than that when the cladding layer CL1 is formed on the entire surface of the first surface SF1 of the semiconductor substrate SUB. Thereby, in the first embodiment, the first semiconductor wafer SW1 can be appropriately detached from the electrostatic chuck. Since the stress at the time of detaching the first semiconductor wafer SW1 from the electrostatic chuck is low, defects caused by the stress are suppressed from being generated in the semiconductor device SD1. As a result, the characteristics of the semiconductor device SD1 can be enhanced. In addition, the yield of the semiconductor device SD1 can be increased.

[Modification]

Figure 11:
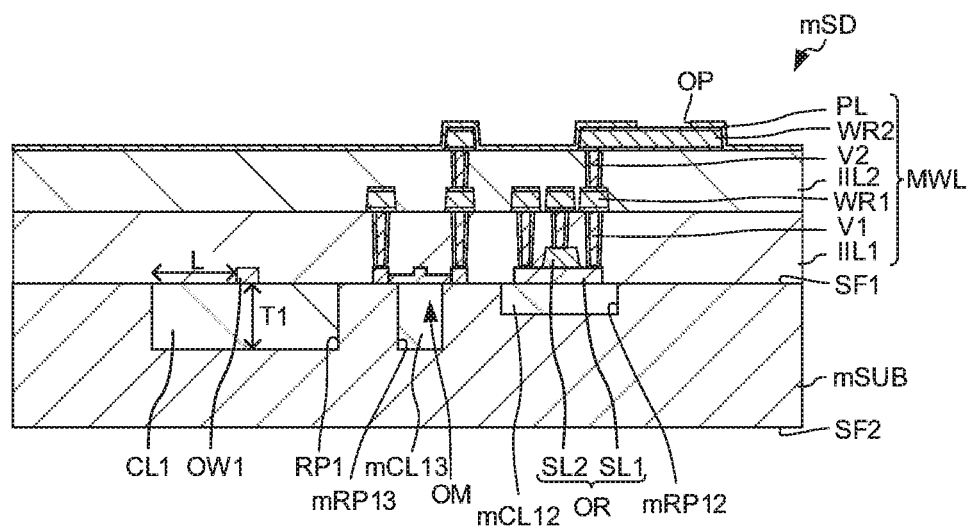
FIG. 11 is a cross-sectional view showing an exemplary configuration of a main portion of a semiconductor device according to modification of the first embodiment.

FIG. 11 is a cross-sectional view showing an exemplary configuration of a main portion of semiconductor device mSD according to a modification of the first embodiment. As shown in FIG. 11, in the semiconductor device mSD according to the modification, the first recess portion RP1, the first recess portion mRP12, and the first recess portion mRP13 are formed on the first surface SF1 of the semiconductor substrate mSUB.

A cladding layer mCL12 is formed in the first recess portion mRP12. A thickness of the cladding layer mCL12 is smaller than the thickness of the cladding layer CL1. A bottom surface of the first recess portion mRP12 also functions as a reflection surface for reflecting the light that entered the optical receiver OR from the multilayer wiring layer MWL side and has passed through the optical receiver OR toward the optical receiver OR again. For this reason, it is preferable that the thickness of the cladding layer mCL12 is small from the viewpoint of allowing the light reflected by the reflective surface to properly enter the optical receiver OR. In the modification, the reduction of optical losses due to the thick cladding layer CL1 and the improvement of the light-receiving efficiencies of the optical receiver OR due to the thin cladding layer mCL12 can be achieved at the same time.

A cladding layer mCL13 is formed in the first recess portion mRP13. A thickness of the cladding layer mCL13 is about the same as the thickness of the cladding layer CL1, and is greater than a thickness of the cladding layer mCL12.

The optical modulator OM is formed on the cladding layer mCL13. More specifically, in the optical modulator OM, the optical waveguide OW2 and a portion of the slab portion SLB are located on the cladding layer mCL13, and in the optical modulator OM, the remaining portion of the slab portion SLB is located on the first surface SF1 of the semiconductor substrate SUB. In other words, the lower surface of the optical waveguide OW2 and the lower surface of a portion of the slab portion SLB directly contact with the cladding layer mCL13, and the lower surface of the remaining portion of the slab portion SLB directly contacts with the first surface SF1 of the semiconductor substrate SUB.

Thus, in the modification, the optical waveguide OW2 and a portion of the slab portion SLB in the optical modulator OM are located on the cladding layer mCL13, and the remaining portion of the slab portion SLB is located on the first surface SF1 of the semiconductor substrate SUB. As a result, it is possible to reduce the quantity of charge storage to the cladding layer mCL13 in the manufacturing process of the semiconductor device mSD, and it is possible to increase the laminating strength of the first surface SF1 generated by the laminating.

In the modification, the optical waveguide OW1 is formed on the cladding layer CL1, the optical receiver OR is formed on the cladding layer mCL12, and the optical modulator OM is formed on the cladding layer mCL13. Thus, in the modification, optical elements are formed on cladding layer having differing shapes and thicknesses. Thus, in the modification, cladding layers suitable for the respective optical elements are applied, and the characteristics of the semiconductor device can be further enhanced.

Second Embodiment

An optoelectronic hybrid device LE2 and a semiconductor device SD2 according to the second embodiment differ from the optoelectronic hybrid device LE1 and the semiconductor device SD1 according to the first embodiment in the configuration of the cladding layers and the presence or absence of the stress-detecting part. Therefore, the same components in the first embodiment are denoted by the same reference numerals, and descriptions thereof are omitted.

(Configuration of Optoelectronic Hybrid Device)

FIG. 1 is a block diagram showing an exemplary configuration of an optoelectronic hybrid device LE2 according to a second embodiment. In FIG. 1, reference numerals indicating components of the optoelectronic hybrid device LE2 according to the second embodiment are indicated in parentheses.

As shown in FIG. 1, the optoelectronic hybrid device LE2 includes a first electronic circuit EC1, a semiconductor device SD2, a light source LS, and an IC chip CP. The semiconductor device SD2 according to the second embodiment includes an optical waveguides OW1, an optical modulator OM, a light output part LO, a light input part LI and an optical receiver OR. The IC chip CP includes a second electronic circuit EC2 and a third electronic circuit EC3.

(Configuration of Semiconductor Device)

Figure 12:
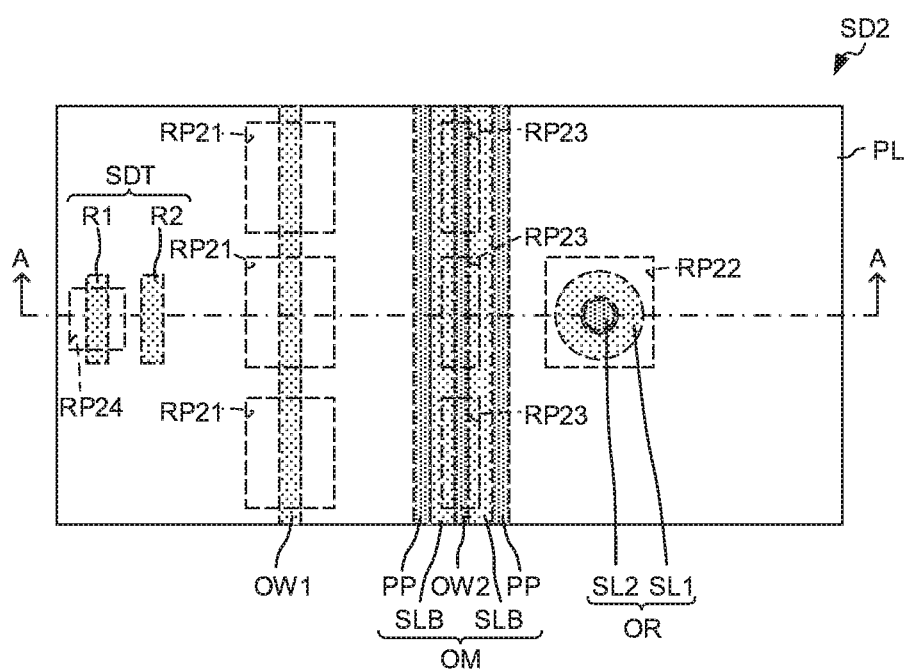
FIG. 12 is a plan view showing an exemplary configuration of a main portion of a semiconductor device according to a second embodiment.
Figure 13:
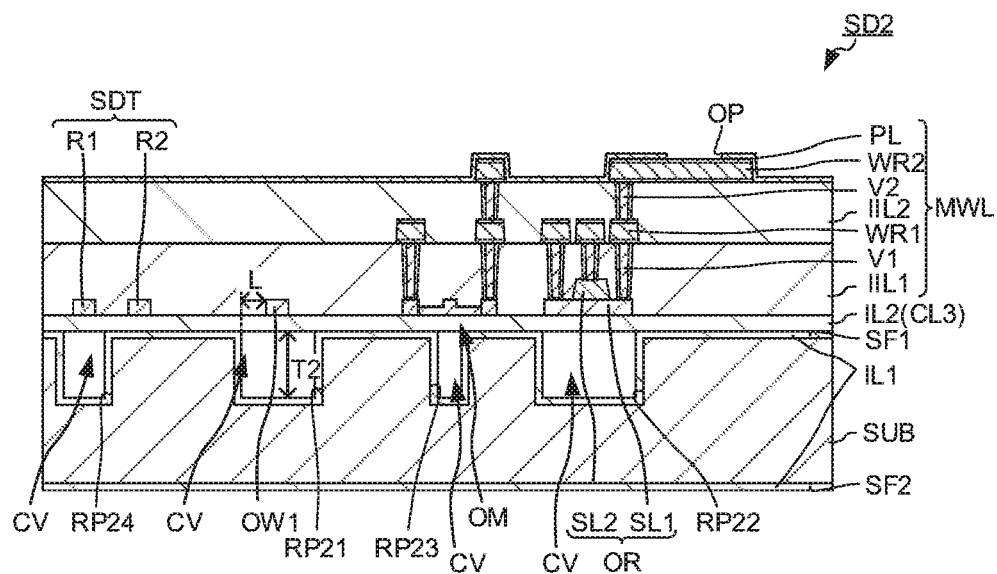
FIG. 13 is a cross-sectional view showing an exemplary configuration of the main portion of the semiconductor device according to the second embodiment.

Next, a configuration of the semiconductor device SD2 according to the embodiment will be described. FIG. 12 is a plan view showing an exemplary configuration of a main portion of the semiconductor device SD2. FIG. 13 is a cross-sectional view showing an exemplary configuration of the main portion of the semiconductor device SD2. FIG. 13 is a cross-sectional view taken along line A-A of FIG. 12. In FIG. 12, a part of the components is omitted from the viewpoint of making the positional relation between the optical waveguides OW1, the optical modulator OM and the optical receiver OR and the stress-detecting part SDT and the second recess portion RP21, RP22, RP23, RP24 easier to see.

The semiconductor device SD2 includes a semiconductor substrate SUB, a first insulating layer IL1, second insulating layer IL2, an optical waveguide OW1, an optical modulator OM, an optical receiver OR, a stress-detecting unit SDT, and a multilayer wiring layer MWL. As will be described in detail later, the stress-detecting part SDT includes a first resistive element R1 and a second resistive element R2. The multilayer wiring layer MWL includes a first interlayer insulating layer IIL1, a first via V1, a first wiring WR1, second interlayer insulating layer IIL2, a second via V2, a second wiring WR2, and a protective layer PL.

The semiconductor substrate SUB supports optical elements such as the optical waveguide OW1, the optical modulator OM and the optical receiver OR and the stress-detecting part SDT via the first insulating layer IL1 and the second insulating layer IL2.

A second recess portion RP21, RP22, RP23, RP24 is formed on the first surface SF1 of the semiconductor substrate SUB. The second recess portion RP21 overlaps with the optical waveguide OW1 in plan view. The second recess portion RP22 overlaps the optical receiver OR in plan view. The second recess portion RP23 overlaps with the optical modulator OM in plan view. The second recess portion RP24 overlaps with a part of the stress-detecting part SDT in plan view. More specifically, the second recess portion RP24 overlaps with the first resistive element R1 without overlapping with the second resistive element R2 in the stress-detecting part SDT.

The position, size, shape, and number of second recess portion RP21, RP22, RP23, RP24 defines the position, size, shape, and number of a cavity CV within the second recess portion RP21, RP22, RP23, RP24, respectively.

The cavity CV is a region surrounded by the first insulating layer IL1 and the second insulating layer IL2 in the second recess portion RP21, RP22, RP23, RP24. The cavity C V formed in second recess portion RP21, RP22, RP23 is a cladding layer for substantially confining the light in the optical element, such as the optical waveguide OW1, the optical modulator OM and the optical receiver OR, to the inside of the optical element. The cavity CV formed in the second recess portion RP24 adjusts a stress applied to the stress-detecting part SDT. More specifically, the cavity CV formed in second recess portion RP24 causes the stress applied to the first resistive element R1 and the stress applied to the second resistive element R2 to be different from each other.

In the second embodiment, a gas is contained in the cavity CV. In other words, in the optical device, the cladding layer on the semiconductor substrate SUB side is a gas contained in the cavity CV.

The gas has a refractive index less than the refractive index of the material of the optical waveguide OW1. The gas is preferable a gas such as an inert gas and a drying gas, e.g., dry air. As a result, it is possible to suppress the optical elements such as the optical waveguide OW1, the optical modulator OM and the optical receiver OR from being oxidized (corroded) by water or oxygen contained in the cavity CV. As a result, it is possible to suppress light loss when the light passes through the optical element. The inert gas is, for example, at least one selected from the group consisting of argon and nitrogen. The dry air is, for example, air of about 10% RH or less at room temperature.

An air pressure in the cavity CV is preferably greater than atmospheric pressure. Due to the atmospheric pressure in the second recess portion RP23, the optical modulator OM can be stressed to increase the carrier mobility in the optical modulator OM. As a result, the modulation efficiency of the optical modulator section LM can be increased, and the optical modulator LM can be miniaturized.

The position, thickness, shape, and number of the cavity CV are appropriately determined in accordance with the position of the optical waveguide OW1, the optical elements, and the stress-detecting part SDT. The cavity CV in second recess portion RP21, RP22, RP23 is formed such that the cavity CV overlaps with optical elements such as the optical waveguide OW1, the optical modulator OM and the optical receiver OR in plan view. The cavity CV in second recess portion RP24 overlaps a portion of the stress-detecting part SDT. More specifically, the cavity CV in second recess portion RP24 overlaps with the first resistive element R1 without overlapping with the second resistive element R2 in the stress-detecting part SDT. The thickness T2 of second recess portion RP21, RP22, RP23 is a distance between an upper surface of the first insulating layer IL1 and a lower surface of the second insulating layer IL2 in the thickness direction of the semiconductor substrate SUB. A thickness of the second recess portion RP24 is not particularly limited.

In the direction along the first surface SF1 of the semiconductor substrate SUB, it is preferable that the distance L between an open end of second recess portion RP2 and the optical waveguide OW1 and the optical modulator OM is greater than the seepage distance of light from the optical waveguide OW1 and the optical modulator OM. For example, the distance L is preferably 2.0 µm or more.

The shape of the cavity CV is not particularly limited. The shape of the cavity CV in plan view is, for example, a rectangular shape. From the viewpoint of facilitating designing, it is preferable that the cavity CV has a side along the extension direction of the optical waveguide OW1 in plan view. In other words, it is preferable that the cavity portion CV has a side facing the side surface of the optical waveguide OW1 in plan view, as shown in FIG. 12.

The number of the cavity CV may be one or plural. In the second embodiment, the number of cavity CV is plural. The cavity CV may overlap with one optical element or may overlap with a plurality of optical elements in plan view. In the second embodiment, each of the plurality of cavies CV overlaps with the optical waveguide OW1, the optical modulator OM or the optical receiver OR in plan view. The cavities CV are arranged intermittently along the optical waveguide OW1 or the optical modulator OM. In other words, one of the plurality of cavities CV overlaps a portion of the optical waveguide OW1 in plan view, and another of the plurality of cavities CV overlaps another portion of the optical waveguide OW1 in plan view. As a result, the tension of the complex film including the second insulator layer IL2 located on the cavity CV can be kept uniform within the semiconductor device SD2, and variations in device characteristics caused by stresses acting on the optical devices can be reduced.

The first insulating layer IL1 is formed on the bottom surface (inner surface) of the first surface SF1, the second surface SF2, the second recess portion RP21, RP22, RP23, RP24 and the side surface (inner surface) of the second recess portion RP21, RP22, RP23, RP24 in the semiconductor substrate SUB. The upper surface of the first insulating layer IL1 directly contacts with second insulating layer IL2. A thickness of the first insulating layer IL1 is, for example, 0.03 µm or more and 0.8 µm or less. The first insulating layer IL1 is formed of, for example, silicon oxide.

The second insulating layer IL2 supports the optical elements and the stress-detecting part SDT. The second insulating layer IL2 directly contacts with the first insulating layer IL1. As a result, the second insulating layer IL2 is laminated to the semiconductor substrate SUB with a greater laminating force through the first insulating layer IL1. The second insulating layer IL2 is formed of, for example, silicon oxide. The optical element is formed in a portion, of the second insulator layer IL2, located on the cavity CV. In plan view, the optical element is formed on a portion, of the second insulating layer IL2, overlapping the cavity CV. For example, a portion, of the second insulating layer IL2, that overlap the optical waveguide OW1 or the second optical waveguide OW2 in plan view function as a cladding layer.

In other words, the cladding layer is formed between the cavity CV and the optical waveguide OW1 and between the cavity CV and the optical waveguide OW2.

The stress-detecting part SDT includes a first resistive element R1 and a second resistive element R2. In plan view, the first resistive element R1 is formed such that the first resistive element R1 overlaps with the cavity CV (second recess portion RP24), and the second resistive element R2 is formed such that the second resistive element R2 does not overlap with the cavity CV. In the stress-detecting part SDT, the stress applied to the optical element by the semiconductor substrate SUB is estimated based on a difference between the resistance values of the first resistive element R1 and the second resistive element R2. Based on the magnitude of the estimated stresses, for example, the control of the operation of the optical modulator OM can be optimized.

The size of the first resistive element R1, the thickness of the first resistive element R1, and the shape of the first resistive element R1 in plan view can be appropriately adjusted according to a desired resistance value. The size, thickness, and configuration of the second resistive element R2 are the same. The shape of the first resistive element R1 in plan view may be, for example, a rod shape extending in the first direction, or may be a sheet shape in which a length in a first direction and a length in a second direction are substantially the same. From the viewpoint of accurately estimating the stresses, it is preferable that the size, thickness, and shape of the first resistive element R1 are substantially similar to the size, thickness, and shape of the second resistive element R2. The materials of the first resistive element R1 and the second resistive element R2 are, for example, silicone. Each of the first resistive element R1 and the second resistive element R2 preferably contains a p-type impurity or an n-type impurity. The impurity concentration of each of the first resistive element R1 and the second resistive element R2 can be appropriately adjusted according to desired resistance values.

(Method of Manufacturing Semiconductor Device)

Next, an exemplary method of manufacturing the semiconductor device SD2 according to the second embodiment will be described. FIGS. 14 to 19 are cross-sectional views showing exemplary steps included in the method of manufacturing the semiconductor device SD2.

The method of manufacturing the semiconductor device SD2 includes, for example, (1) a step of providing the first semiconductor wafer SW1 and the third semiconductor wafer SW3, (2) a step of forming the second recess portion RP21, RP22, RP23, RP24, (3) a step of forming the first insulating layer IL1, (4) a step of laminating the third semiconductor wafer, (5) a step of forming the optical elements and the stress-detecting part SDT, and (6) a step of forming the multilayer wiring layer MWL.

(1) Providing the First Semiconductor Wafer SW1 and the Third Semiconductor Wafer SW3

Figure 14:
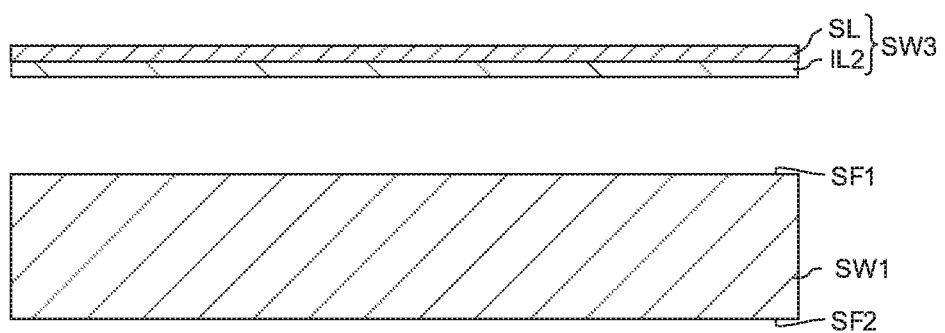
FIG. 14 is a cross-sectional view showing an exemplary step included in the method of manufacturing the semiconductor device according to the second embodiment.

First, as shown in FIG. 14, a first semiconductor wafer SW1 and a third semiconductor wafer SW3 are provided. The first semiconductor wafer SW1 and the third semiconductor wafer SW3 may be manufactured or purchased as a commercial product. The first semiconductor wafer SW1 provided is held by an electrostatic chuck.

The third semiconductor wafer SW3 includes a second insulating layer IL2 and a semiconductor layer SL formed on the second insulating layer IL2. The third semiconductor wafer SW3 is formed by forming an oxide film on a surface of the semiconductor layer SL by, for example, a thermal oxidation method. The material of the semiconductor layer SL is, for example, silicon. The material of the insulating layer IL1 is, for example, silicon oxide.

(2) Forming the Second Recess Portion RP21, RP22, RP23, RP24

Figure 15:
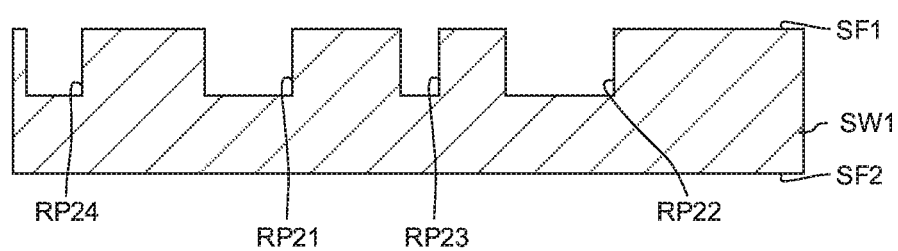
FIG. 15 is a cross-sectional view showing an exemplary step included in the method of manufacturing the semiconductor device according to the second embodiment.

Next, as shown in FIG. 15, a second recess portion RP21, RP22, RP23, RP24 is formed on the first surface SF1 of the first semiconductor wafer SW1. Examples of method of forming the second recess portion RP21, RP22, RP23, RP24 include dry etching method and wet etching method.

(3) Forming the First Insulating Layer IL1

Figure 16:
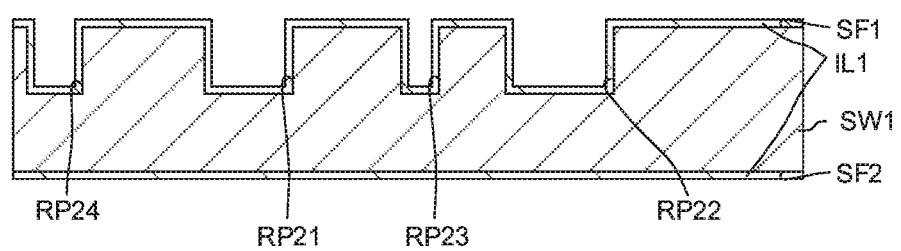
FIG. 16 is a cross-sectional view showing an exemplary step included in the method of manufacturing the semiconductor device according to the second embodiment.

Next, as shown in FIG. 16, the first insulating layer IL1 is formed. The first insulating layer IL1 is formed at least on the first surface SF1 of the first semiconductor wafer SW1. In the second embodiment, a first insulating layer IL1 is formed on the first surface SF1 and the second surface SF2 of the first semiconductor wafer SW1. Examples of the method of forming the first insulating layer IL1 include CVD method and thermal oxidization method.

(4) Laminating of the Third Wafer SW3

Figure 17:
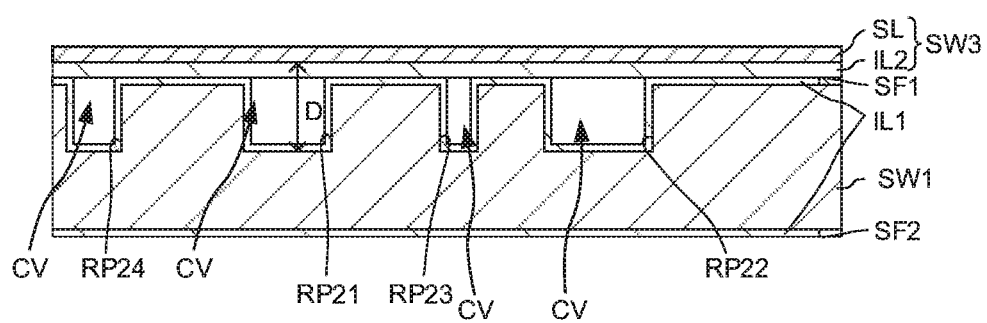
FIG. 17 is a cross-sectional view showing an exemplary step included in the method of manufacturing the semiconductor device according to the second embodiment.

Next, as shown in FIG. 17, the first insulating layer IL1 formed on the first semiconductor wafer SW1 and the second insulating layer IL2 of the third semiconductor wafer SW3 are laminated to each other. As a result, the cavity CV is formed. As described above, a surface of the first semiconductor wafer SW1 is oxidized. As a result, the first semiconductor wafer SW1 can be laminated to the third semiconductor wafer SW3 with a high laminating force through the first insulating layer IL1 and the second insulating layer IL2.

(5) Formation of Optical Elements and Stress-Detecting Part SDT

Figure 18:
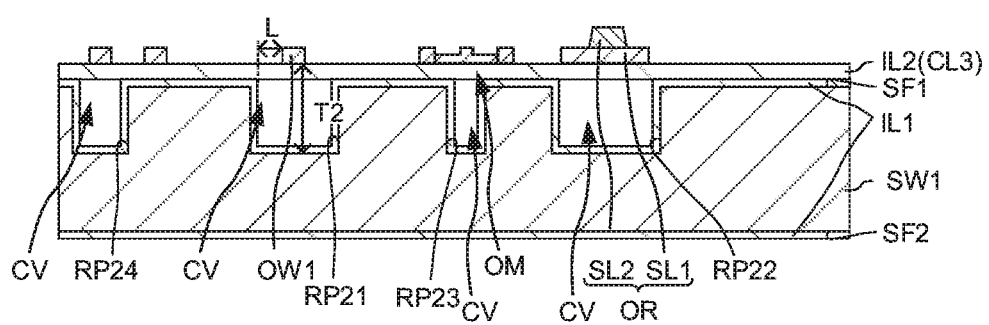
FIG. 18 is a cross-sectional view showing an exemplary step included in the method of manufacturing the semiconductor device according to the second embodiment.

Next, as shown in FIG. 18, the semiconductor layer SL of the third semiconductor wafer SW3 is processed to form the optical elements and the stress-detecting part SDT on the second insulating layer IL2. In the second embodiment, the optical waveguide OW1, the optical modulator OM and the optical receiver OR are formed as the optical elements. The optical element and the stress-detecting part SDT are formed by patterning the semiconductor layer SL and ion-implanting an impurity into a predetermined region. The patterning method of the semiconductor layer SL is, for example, a dry etching method.

(6) Forming the Multilayer Wiring Layer MWL

Figure 19:
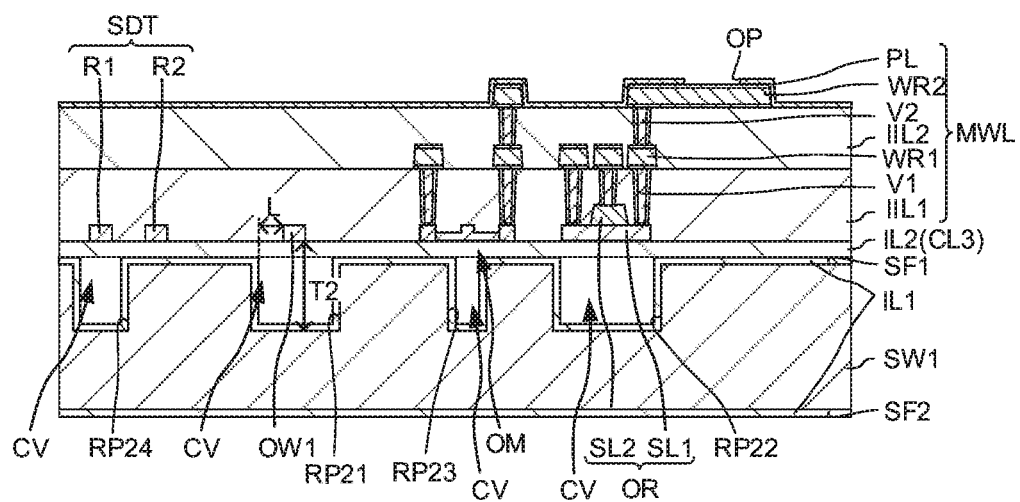
FIG. 19 is a cross-sectional view showing an exemplary step included in the method of manufacturing the semiconductor device according to the second embodiment.

Next, as shown in FIG. 19, the multilayer wiring layer MWL is formed on the second insulating layer IL2.

Finally, the structure obtained by the above steps is detached from the electrostatic chuck and diced to obtain a plurality of singulated semiconductor devices SD2.

(Effect)

The second embodiment has effect similar to the first embodiment. The semiconductor device SD2 according to the second embodiment includes a gas formed in the second recess portion RP2 as a lower cladding of the optical waveguide OW1, OW2. As a result, the difference between the refractive index of the material of the optical waveguide OW1, OW2 and the refractive index of the material of the lower cladding layer becomes greater than that of the semiconductor device SD1 according to the first embodiment including the insulating film as the lower cladding layer of the optical waveguide OW1, OW2. Therefore, the semiconductor device SD2 according to the second embodiment has greater optical confinement effects. As a result, the second embodiment can further enhance the characteristics of the semiconductor device.

It should be noted that the present invention is not limited to the embodiments, and various modifications can be made without departing from the gist thereof. For example, the multilayer wiring layer MWL may further include other layers. Examples of such other layers include a silicon oxide film and a silicon nitride film. The wiring of the multilayer wiring layer MWL may have a so-called damascene structure. Further, the optical waveguide OW1, OW2 may have sizes on p order.

In the step of providing the first semiconductor wafer SW1, the surface of the first semiconductor wafer SW1 may be oxidized in advance by a thermal oxidation method.

In addition, even when a specific numerical value example is described, it may be a numerical value exceeding the specific numerical value, or may be a numerical value less than the specific numerical value, except when it is theoretically obviously limited to the numerical value. In addition, the component means "B containing A as a main component" or the like, and the mode containing other components is not excluded.

Further, at least a part of the embodiment and at least a part of each modification may be arbitrarily combined with each other. For example, the configuration of the first slab portion SLB1 (the second slab portion SLB2) may be appropriately designed.

What is claimed is:

1. A semiconductor device comprising:
   a semiconductor substrate having a first surface and a second surface opposite the first surface, wherein the semiconductor substrate includes a first recess portion formed on the first surface;
   a first cladding layer located in the first recess portion;
   a first optical waveguide formed on the first cladding layer, wherein the first optical waveguide overlaps the first cladding layer in plan view;
   a first insulating layer formed on the first surface of the semiconductor substrate and an inner surface of the first recess portion;
   a second insulating layer formed on the first insulating layer and the first cladding, wherein the first optical waveguide is formed on a portion of the second insulating layer, and wherein the portion of the second insulating layer overlaps the first cladding layer in plan view;
   a first resistive element formed on the second insulating layer; and
   a second resistive element formed on the second insulating layer,
   wherein the semiconductor substrate includes a second recess portion formed on the first surface of the semiconductor substrate, and
   wherein the second recess portion overlaps the first resistive element without overlapping the second resistive element in plan view.

2. The semiconductor device according to claim 1, wherein the first cladding is an insulating film.

3. The semiconductor device according to claim 2, comprising:
   a second cladding layer located in a third recess portion formed on the first surface of the semiconductor substrate; and
   an optical receiver formed on the second cladding layer, wherein a thickness of the second cladding layer is less than a thickness of the first cladding layer.

4. The semiconductor device according to claim 1, wherein the first cladding layer is a gas contained in the first recess portion.

5. The semiconductor device according to claim 1, wherein an upper surface of the first insulating layer and a lower surface of the second insulating layer are directly contacted with each other.

6. The semiconductor device according to claim 1, comprising a second optical waveguide formed on the first cladding.

7. The semiconductor device according to claim 1, comprising a third cladding located in a third recess portion formed on the first surface of the semiconductor substrate,
    wherein the first cladding layer overlaps a portion of the first optical waveguide in plan view, and
    wherein the third cladding overlaps with another portion of the first optical waveguide in plan view.

* * * * *